(12) United States Patent
Li et al.

(10) Patent No.: US 11,917,288 B2
(45) Date of Patent: Feb. 27, 2024

(54) IMAGE PROCESSING METHOD AND APPARATUS

(71) Applicant: Huawei Technologies Co., Ltd., Shenzhen (CN)

(72) Inventors: Zhihao Li, Shenzhen (CN); Xiaofei Wu, Shenzhen (CN); Songcen Xu, Shenzhen (CN); Jianzhuang Liu, Shenzhen (CN); Youliang Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 413 days.

(21) Appl. No.: 17/308,535

(22) Filed: May 5, 2021

(65) Prior Publication Data

US 2021/0258506 A1    Aug. 19, 2021

Related U.S. Application Data

(63) Continuation of application No. PCT/CN2019/107133, filed on Sep. 21, 2019.

(30) Foreign Application Priority Data

Nov. 6, 2018 (CN) .......................... 201811312554.X

(51) Int. Cl.
*H04N 23/63* (2023.01)
*G06T 7/11* (2017.01)
*G06N 3/08* (2023.01)

(52) U.S. Cl.
CPC .............. *H04N 23/635* (2023.01); *G06T 7/11* (2017.01); *G06N 3/08* (2013.01); *G06T 2207/20132* (2013.01)

(58) Field of Classification Search
CPC .... H04N 23/635; H04N 23/611; H04N 23/64; G06T 7/11; G06T 2207/20132; G06T 7/155; G06T 2207/20044; G06T 2207/30196; G06T 7/162; G06T 7/194; G06N 3/08; G06N 5/04; G06N 20/00
See application file for complete search history.

(56) References Cited

U.S. PATENT DOCUMENTS

| | | | |
|---|---|---|---|
| 2008/0075338 | A1 | 3/2008 | Muramatsu et al. |
| 2011/0157424 | A1 | 6/2011 | Makino et al. |
| 2011/0285748 | A1* | 11/2011 | Slatter ..................... G06T 11/60 345/629 |
| 2013/0050225 | A1 | 2/2013 | Nakajima |
| 2016/0357406 | A1* | 12/2016 | Lee ......................... G06V 10/17 |

(Continued)

FOREIGN PATENT DOCUMENTS

| | | |
|---|---|---|
| CN | 101146167 A | 3/2008 |
| CN | 103218772 A | 7/2013 |

(Continued)

*Primary Examiner* — Christopher K Peterson
(74) *Attorney, Agent, or Firm* — Conley Rose, P.C.

(57) ABSTRACT

An image processing method includes detecting human skeleton key points of a character in an image, and for the to-be-processed image, generating a cropping region based on the human skeleton key points and a preset rule, and using the to-be-processed image selected by using the cropping region as an output object. The human skeleton key points and the preset rule are set based on photographing experience.

20 Claims, 8 Drawing Sheets

(56) References Cited

U.S. PATENT DOCUMENTS

| | | | |
|---|---|---|---|
| 2019/0080431 A1* | 3/2019 | Choi | ............... G06V 40/172 |
| 2020/0089958 A1 | 3/2020 | Zhu et al. | |
| 2021/0258501 A1 | 8/2021 | Li et al. | |

FOREIGN PATENT DOCUMENTS

| CN | 104717413 A | 6/2015 |
|---|---|---|
| CN | 105657249 A | 6/2016 |
| CN | 106210510 A | 12/2016 |
| CN | 107749952 A | 3/2018 |
| CN | 107835373 A | 3/2018 |
| CN | 108009998 A | 5/2018 |
| CN | 105100625 B | 6/2018 |
| CN | 108460362 A | 8/2018 |
| CN | 108510491 A | 9/2018 |
| CN | 108537203 A | 9/2018 |
| CN | 109660719 A | 4/2019 |
| CN | 109788191 A | 5/2019 |
| CN | 109872340 A | 6/2019 |
| CN | 109905593 A | 6/2019 |
| CN | 109960962 A | 7/2019 |
| CN | 110147833 A | 8/2019 |
| JP | 2016212688 A | 12/2016 |

* cited by examiner

IMAGE PROCESSING METHOD AND APPARATUS

CROSS-REFERENCE TO RELATED APPLICATIONS

This application is a continuation of International Patent Application No. PCT/CN2019/107133 filed on Sep. 21, 2019, which claims priority to Chinese Patent Application No. 201811312554.X filed on Nov. 6, 2018. The disclosures of the aforementioned applications are hereby incorporated by reference in their entireties.

TECHNICAL FIELD

The present disclosure relates to the field of artificial intelligence, and in particular, to an artificial intelligence technology-based photographing method and a terminal.

BACKGROUND

Artificial intelligence is a theory, a method, a technology, and an application system for using a digital computer or a machine controlled by a digital computer to simulate and extend human intelligence, perceive an environment, obtain knowledge, and use the knowledge to obtain an optimal result. In other words, artificial intelligence is a branch of computer science, and artificial intelligence is intended to understand essence of intelligence and generate a new intelligent machine that can react in a similar manner to human intelligence. Artificial intelligence is to study design principles and implementation methods of various intelligent machines, so that the machines can be equipped with functions of perception, inference, and decision-making. Research in the field of artificial intelligence includes robots, natural language processing, computer vision, decision-making and inference, human computer interaction, recommendation and searching, an artificial intelligence basic theory, and the like.

In recent years, a photographing function of a smartphone has been greatly developed, and an increasing quantity of people use mobile phones to perform photographing. However, most people lack related photographing skills. Especially in a character photographing scenario, most people still take photos randomly and do not know related photographing skills summarized by professional photographers. Therefore, many of their photos including characters are cropped on a human joint point such as an ankle, a knee, and a wrist, that is, a boundary between different parts of a human body. Consequently, the photos have a relatively strong sense of being cut off, and a sense of beauty of characters in the photos is damaged.

SUMMARY

To resolve a technical problem in other approaches, this application provides an image processing method. The image processing method may be applied to a smartphone, so that a user who does not have enough photographing experience can easily take a character photo that conforms to photographing aesthetics, thereby preventing a character in the photo from having a sense of being cut off and preventing damage to a sense of beauty of the character.

According to a first aspect, an embodiment of the present disclosure provides an image processing method, where the method includes obtaining a target image including a character, detecting the character in the target image to obtain a human skeleton key point set corresponding to the character, where the human skeleton key point set includes a plurality of human skeleton key points, generating a cropping region based on the human skeleton key point set and a preset rule, so that a human skeleton key point in the cropping region meets the preset rule, and generating a target image file based on an image part of the target image in the cropping region. It may be understood that the cropping region may be considered as performing selection on the target image, in other words, a part of the target image is selected by using the cropping region.

In a possible implementation of the first aspect, the following method is used to detect the character in the target image to obtain the human skeleton key point set detecting the character in the target image by using a human skeleton key point model, to obtain the human skeleton key point set, where each human skeleton key point includes location information and a confidence level, the location information is used to indicate a location of a corresponding human skeleton key point in the target image, the confidence level is used to indicate trustworthiness of the corresponding human skeleton key point, the human skeleton key point model is obtained through training by using labeled data, and the labeled data is an image that includes a character and in which human skeleton key points of the character are labeled.

In a possible implementation of the first aspect, the detecting the character in the target image by using a human skeleton key point model, to obtain the human skeleton key point set includes inputting the target image into the human skeleton key point model to obtain a human skeleton key point heat map, where the human skeleton key point heat map is an image in which human skeleton key points are labeled based on the target image, and extracting human skeleton key points from the human skeleton key point heat map to obtain the human skeleton key point set.

In a possible implementation of the first aspect, the generating a cropping region based on the human skeleton key point set and a preset rule includes detecting whether each of the human skeleton key points in the human skeleton key point set meets the preset rule, and generating the cropping region based on location information of a human skeleton key point that meets the preset rule.

In a possible implementation of the first aspect, the following method is used to determine whether a human skeleton key point meets the preset rule determining whether a confidence level of a human skeleton key point A is greater than a preset threshold, if the confidence level of the human skeleton key point A is greater than the preset threshold, calculating location information of a reference point C based on the human skeleton key point A and a human skeleton key point B, and further determining whether the reference point C is located in the target image, where if the reference point C is located in the target image, it indicates that the human skeleton key point A meets the preset rule, or if the reference point C is not located in the target image, it indicates that the human skeleton key point A does not meet the preset rule, where the human skeleton key point A is a human skeleton key point to be used in determining whether the human skeleton key point meets the preset rule, and the human skeleton key point B is a human skeleton key point that is adjacent to the human skeleton key point A and that is close to a human heart.

In a possible implementation of the first aspect, the obtaining a target image includes obtaining the target image in real time in a photographing mode by using a camera, and correspondingly, the generating a target image file based on an image part of the target image in the cropping region includes generating the target image file based on the image part of the target image in the cropping region in response to a photographing instruction.

In a possible implementation of the first aspect, the obtaining a target image includes obtaining the target image from a graphics library, and correspondingly, the generating a target image file based on an image part of the target image in the cropping region includes generating the target image file based on the image part of the target image in the cropping region in response to a cropping instruction. It should be noted that the cropping instruction herein may be alternatively a storage instruction.

In a possible implementation of the first aspect, before the generating a target image file based on an image part of the target image in the cropping region, the image processing method further includes displaying the target image in an image preview region, and applying the cropping region to the target image, where the cropping region segments the target image into an intra-region image and an extra-region image, and correspondingly, the generating a target image file based on an image part of the target image in the cropping region includes generating the target image file based on the intra-region image.

In a possible implementation of the first aspect, before the generating a target image file based on an image part of the target image in the cropping region, the image processing method further includes displaying the target image in an image preview region, displaying a guide identifier on the target image, where the guide identifier is used to guide a user to adjust the camera, and applying the cropping region to the adjusted target image, where the cropping region segments the adjusted target image into an intra-region image and an extra-region image, and correspondingly, the generating a target image file based on an image part of the target image in the cropping region includes generating the target image file based on the intra-region image.

In a possible implementation of the first aspect, the applying the cropping region to the target image includes displaying a cropping box on the target image to segment the target image into an intra-box image and an extra-box image, where the intra-box image is the intra-region image, and the extra-box image is the extra-region image, or adjusting a display parameter of the target image to segment the target image into two visually significantly different regions, where one region corresponds to the intra-region image, and the other region corresponds to the extra-region image.

In a possible implementation of the first aspect, the applying the cropping region to the adjusted target image includes displaying a cropping box on the adjusted target image to segment the adjusted target image into an intra-box image and an extra-box image, where the intra-box image is the intra-region image, and the extra-box image is the extra-region image, or adjusting a pixel parameter of the adjusted target image to segment the adjusted target image into two visually significantly different regions, where one region corresponds to the intra-region image, and the other region corresponds to the extra-region image.

According to the image processing method provided in this embodiment of this application, the corresponding cropping region is generated based on the preset rule and the human skeleton key points of the character in the to-be-processed image, and the part that is of the to-be-processed image and that is selected by using the cropping region is output as the target image. The human skeleton key points and the preset rule are set based on photographing experience. Therefore, according to the image processing method provided in this embodiment of this application, a user who does not have enough photographing experience can easily obtain an image that conforms to photographing aesthetics, so that user experience is enhanced.

According to a second aspect, an embodiment of this application provides a terminal or an apparatus, used for image processing, and the terminal or the apparatus has a function of implementing the method according to any one of the first aspect and the possible implementations of the first aspect. The function may be implemented by hardware, or may be implemented by hardware by executing corresponding software. The hardware or the software includes one or more modules corresponding to the function.

According to a third aspect, an embodiment of this application provides an apparatus, used for image processing. The apparatus includes a processor and a memory. The memory is configured to store computer executable instructions, and when the apparatus runs, the processor executes the computer executable instructions stored in the memory, so that the apparatus performs the method according to any one of the first aspect and the possible implementations of the first aspect.

According to a fourth aspect, an embodiment of this application provides a computer-readable storage medium. The computer-readable storage medium stores instructions, and when the instructions run on a computer, the computer can perform the method according to any one of the first aspect and the possible implementations of the first aspect.

According to a fifth aspect, an embodiment of this application provides a computer program product including computer operation instructions. When the computer program product runs on a computer, the computer can perform the method according to any one of the first aspect and the possible implementations of the first aspect.

According to a sixth aspect, an embodiment of this application provides a chip system. The chip system includes a processor, configured to support a device in implementing functions involved in any one of the first aspect and the possible implementations of the first aspect. In a possible design, the chip system further includes a memory. The memory is configured to store program instructions and data that are necessary for the chip system. The chip system may include a chip, or may include a chip and another discrete component.

According to a seventh aspect, an embodiment of the present disclosure provides a photographing method, which may be applied to a device with a camera and a screen, to improve photographing experience of a user. After the user enables a photographing function of the device, the method includes obtaining a real-time image in a photographing mode by using the camera, displaying, on the screen of the device, the real-time image obtained by the camera, applying a cropping box to the real-time image to segment the real-time image into an intra-box image and an extra-box image, and generating a corresponding image file based on the intra-box image in response to a photographing instruction of the user. The image file (a photo or a video) obtained by using the photographing method provided in this embodiment of the present disclosure is not the image obtained by the camera in real time, but is the intra-box image, in other words, when the user opens the generated image file, the intra-box image is displayed. According to this photographing method, in some photographing scenarios, photographing flexibility can be improved, and user experience can be enhanced. It should be noted that the cropping box is a logical concept, and the image obtained by the camera may be segmented into the intra-box image and the extra-box image in a plurality of specific manners.

In a possible implementation of the seventh aspect, the cropping box is applied by superimposing a closed box on the real-time image obtained by the camera, to segment the real-time image into the intra-box image and the extra-box image. In other words, an image part of the real-time image in the closed box is the intra-box image, and an image part of the real-time image outside the closed box is the extra-box image. In specific implementation, edges forming the closed box may be processed as being semi-transparent or partially displayed, to reduce impact on image preview of the user that is caused by superimposing the closed box on the real-time image, or a color of edges forming the closed box may be set, or the edges may be set to blink, to draw attention of the user. Optionally, the closed box may be adjusted according to an instruction of the user. For example, when the user touches a lower left corner of the closed box and performs sliding, the closed box is narrowed.

In a possible implementation of the seventh aspect, the cropping box is applied by adjusting a display parameter of the real-time image obtained by the camera, so that the real-time image can be visually segmented into the intra-box image and extra-box image. For example, brightness or definition of the intra-box image is higher than that of the extra-box image. In this way, the real-time image obtained by the camera can be segmented into the intra-box image and the extra-box image by using a friendly interface, and attention of the user can be shifted to the to-be-stored intra-box image. It should be noted that the image file stored in this embodiment of the present disclosure can be restored, after specific processing, to the image obtained by the camera in real time.

In a possible implementation of the seventh aspect, a first photographing control and a second photographing control are displayed in a function display region of the screen, and when the user touches the second photographing control, a target image file is generated based on the intra-box image in response to a photographing instruction of the second photographing control, and an image is further stored or presented. Correspondingly, when the user touches the first photographing control, in response to a photographing instruction of the first photographing control, a target image file is generated based on the real-time image obtained by the camera, and an image is further stored or presented. In this way, the user can select and obtain a required image based on a requirement, so that photographing flexibility is improved. The function display region is a display region that is on the screen and that is used to display controls related to photographing, and the function display region and an image preview region may be separated through setting, or the function display region may be superimposed on an image preview region. In another possible implementation, the first photographing control and/or the second photographing control are or is implemented by using physical keys or a physical key.

In a possible implementation of the seventh aspect, an image ratio option is displayed in the function display region of the screen, or an image ratio option is hidden, and when the user selects an image ratio, a cropping box matching the selected image ratio is applied based on the image ratio selected by the user. The selected image ratio directly affects a size of the target image file generated based on the intra-box image in response to the photographing instruction and a length-width ratio of a corresponding image. Common image ratios are 1:1, 16:9, 9:16, 4:3, and the like. Providing the image ratio to the user during photographing can improve photographing flexibility and enhance user experience. With support of an artificial intelligence technology, a suitable image ratio may be intelligently selected for the user by recognizing the real-time image obtained by the camera, so that user experience is further enhanced.

In a possible implementation of the seventh aspect, before the photographing instruction is triggered, when an intra-box image preview instruction is received, the intra-box image may be displayed in the entire image preview region for the user to view or adjust. After the user performs adjustment and exits a preview mode, the cropping box also changes accordingly, so that when the target image file generated in response to the photographing instruction is displayed, the target image file is an image viewed after the user performs adjustment.

In a possible implementation of the seventh aspect, whether the cropping box is applied to the real-time image obtained by the camera may be preset by the user, and only after the user enables an intelligent cropping function, the cropping box is applied to the real-time image obtained by the camera, so that a corresponding function can be better implemented based on wishes of the user, and user experience can be enhanced.

In a possible implementation of the seventh aspect, the cropping box is applied, according to a preset cropping rule, to the real-time image obtained by the camera. The preset cropping rule may be performing segmentation into the intra-box image and the extra-box image by extending a fixed distance outward from a center of the real-time image. A part outside the fixed distance is the extra-box image, especially for distant photographing in a scenario in which obstacles are cluttered. In this way, an obstacle in a lens scene that the user wants to avoid can be simply removed. Alternatively, a peripheral region, of the real-time image, whose color parameter is quite different from a color parameter of a central region of the real-time image may be recognized based on the artificial intelligence technology, and the cropping box may be applied to classify the peripheral area as the extra-box image, so that the target image file generated after photographing does not include image data of the peripheral region.

According to an eighth aspect, an embodiment of this application provides a photographing device. The photographing device includes a processor and a memory. The memory is configured to store computer executable instructions, and when the apparatus runs, the processor executes the computer executable instructions stored in the memory, so that the photographing device performs the method according to any one of the seventh aspect and the possible implementations of the seventh aspect.

According to the image processing method provided in the embodiments of this application, the corresponding cropping region is generated based on the preset rule and the human skeleton key points of the character in the to-be-processed image, and the part that is of the to-be-processed image and that is selected by using the cropping region is output as the target image. The human skeleton key points and the preset rule are set based on photographing experience. Therefore, according to the image processing method provided in the embodiments of this application, a user who does not have enough photographing experience can easily obtain an image that conforms to photographing aesthetics, so that user experience is enhanced.

DESCRIPTION OF EMBODIMENTS

To make the objectives, technical solutions, and advantages of this application clearer, the following further describes technical solutions of this application in detail with reference to the accompanying drawings. Clearly, the described embodiments in this application are merely some but not all of the embodiments of the present disclosure. All other embodiments obtained by persons of ordinary skill in the art based on the embodiments of this application without creative efforts shall fall within the protection scope of the present disclosure.

Figure 1:
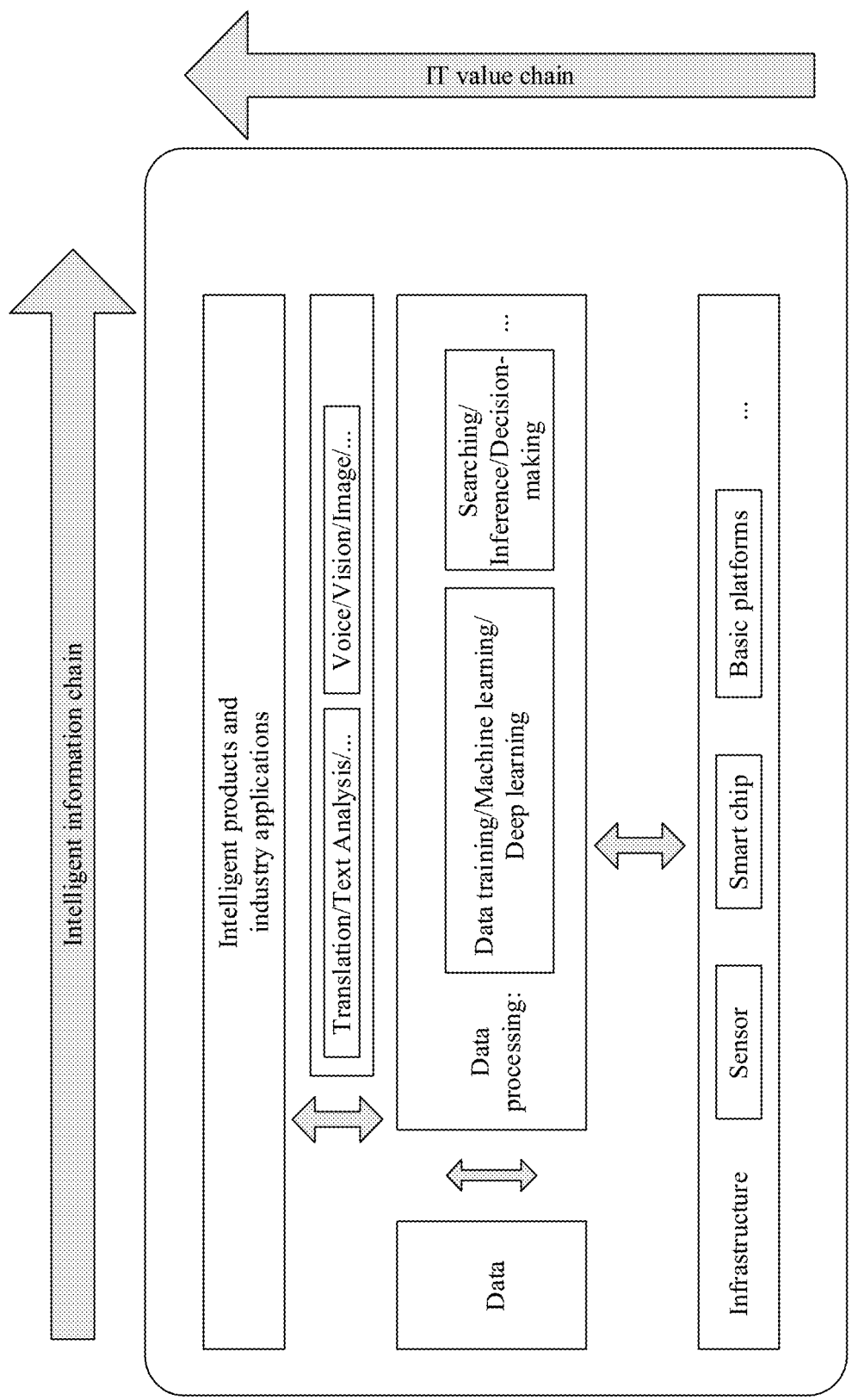
FIG. 1 is a schematic diagram of a main framework of artificial intelligence according to an embodiment of this application.

FIG. 1 is a schematic diagram of a main framework of artificial intelligence. The main framework describes an overall working procedure of an artificial intelligence system, and is applicable to a general requirement of the field of artificial intelligence.

The following describes the main framework of artificial intelligence from two dimensions "intelligent information chain" (horizontal axis) and "IT value chain" (vertical axis).

The "intelligent information chain" reflects a series of processes from data obtaining to processing, which may be, for example, a general process of intelligent information perception, intelligent information representation and formation, intelligent inference, intelligent decision-making, and intelligent execution and output. In this process, data experiences a condensing process of "data→information-→knowledge→wisdom".

The "IT value chain" reflects, from an industrial ecological process from an underlying infrastructure of artificial intelligence and information (providing and processing technology implementation) to a system, value that artificial intelligence brings to the information technology industry.

(1) Infrastructure.

The infrastructure provides computing capability support for the artificial intelligence system, implements communication with the outside world, and implements support by using basic platforms. A sensor is used for communication with the outside. A computing capability is provided by a smart chip (a hardware acceleration chip such as a central processing unit (CPU), an network processing unit (NPU), a graphics processing unit (GPU), an application-specific integrated circuit (ASIC), or a field-programmable gate array (FPGA)). The basic platforms include related platforms such as a distributed computing framework and a network and assurance and support of the related platforms, and may include cloud storage and computing, interconnection and interworking networks, and the like. For example, the sensor communicates with the outside to obtain data, and the data is provided, for calculation, to a smart chip in the distributed computing system provided by the basic platforms.

(2) Data.

Data at an upper layer of the infrastructure is used to represent a data source of the field of artificial intelligence. The data involves graphics, images, voice, and texts, and also involves Internet of things data of a conventional device, including service data of an existing system and perception data such as a force, displacement, a fuel level, temperature, and humidity.

(3) Data Processing.

The data processing usually includes data training, machine learning, deep learning, searching, inference, decision-making, and another manner.

The machine learning and deep learning may perform symbolized and formalized intelligent information modeling, extraction, preprocessing, training, and the like on data.

The inference is a process in which a computer or the intelligent system simulates an intelligent inference manner of human beings, and uses formalized information to perform machine thinking and resolve problems according to an inference control policy. Typical functions are searching and matching.

The decision-making is a process of making a decision after inference is performed on intelligent information, and usually provides functions such as classification, sorting, and prediction.

(4) General Capabilities.

After the foregoing data processing is performed on data, some general capabilities may be further obtained based on a result of data processing, and may be, for example, an algorithm or a general-purpose system such as translation, text analysis, computer vision processing, voice recognition, or image recognition.

(5) Intelligent Products and Industry Applications.

The intelligent products and industry applications are products and applications of the artificial intelligence system in various fields, and are encapsulation of an overall solution of artificial intelligence and productization of intelligent information decisions for application. Application fields include intelligent manufacturing, intelligent transportation, smart household, intelligent medical care, intelligent security, automated driving, safe cities, intelligent terminals, and the like.

This application mainly relates to the parts of data processing and general capabilities in the main framework of artificial intelligence shown in FIG. 1.

A human skeleton key point is described herein in detail. The human skeleton key point is a point, for example, a knee joint or an elbow joint, that is in a human body and that is closely related to photographing aesthetics. It should be noted that not all human joints are human skeleton key points in this application. From a perspective of photographing aesthetics, if a boundary of a character photo is located at a knee or a wrist of a person, there is a relatively strong visual sense of being cut off, and a sense of beauty of the character image is damaged, if a boundary of a character photo is not located at a knee or a wrist, there is a visual sense of being extended for a limb or a trunk, and there is a sense of beauty of the character image. Referring to FIG.

Figure 2:
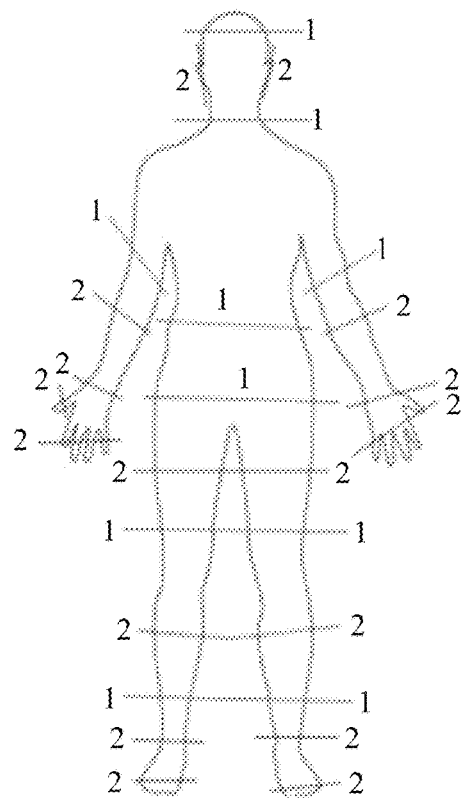
FIG. 2 is a schematic diagram of human skeleton key points according to an embodiment of this application.
Figure 3:
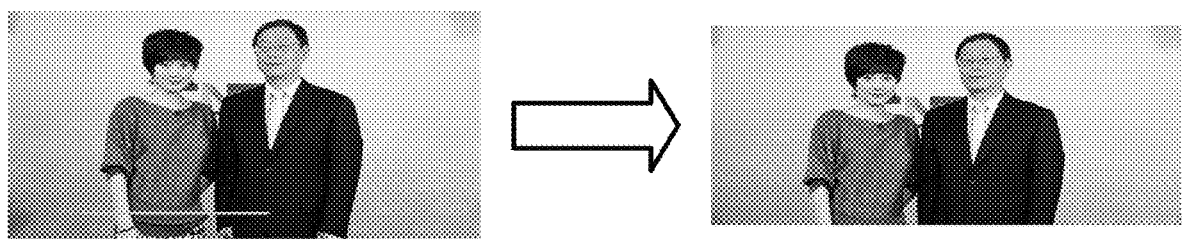
FIG. 3 is a schematic diagram of comparison of a visual difference when an image boundary is in different parts of a human body according to an embodiment of this application.

2, if a boundary of a character image is located on a line numbered 2, there is a visual sense of being cut off, affecting a sense of beauty of the character image, if a boundary of a character image is located on a line numbered 1, there is a visual sense of being extended and a sense of beauty of the character image. In an example of the embodiments of this application, a point (for example, a joint or a bone projection) on the line numbered 1 is defined as a human skeleton key point. To more intuitively reflect a visual difference when a boundary of an image is located on different locations, refer to FIG. 3. A boundary of a left image in FIG. 3 is located on the line numbered 2 in FIG. 2, and the left image may be horizontally cropped from a horizontal line of the left image to obtain a right image in FIG. 3, in other words, a boundary of the right image in FIG. 3 is located on the line numbered 1 in FIG. 2. Visually, the right image in FIG. 3 has a better sense of being extended and a better sense of beauty than the left image in FIG. 3. The human skeleton key point in the embodiments of this application is a point that is in a human body, related to a visual effect of a character image, and summarized based on experience of photographing aesthetics. How to specifically define the human skeleton key point is related to experience, and is not limited in this application. However, a basic commonality of human skeleton key points in the embodiments of this application is that if the human skeleton key points are located on a boundary of an image, a sense of beauty of the character image is affected. In the embodiments of this application, joints, bond projections, and the like corresponding to the line numbered 1 in FIG. 2 may be defined as human skeleton key points, or a definition of another reference point (corresponding to the human skeleton key point in this embodiment of this application) related to photographing aesthetics in other approaches may be used.

Figure 4:
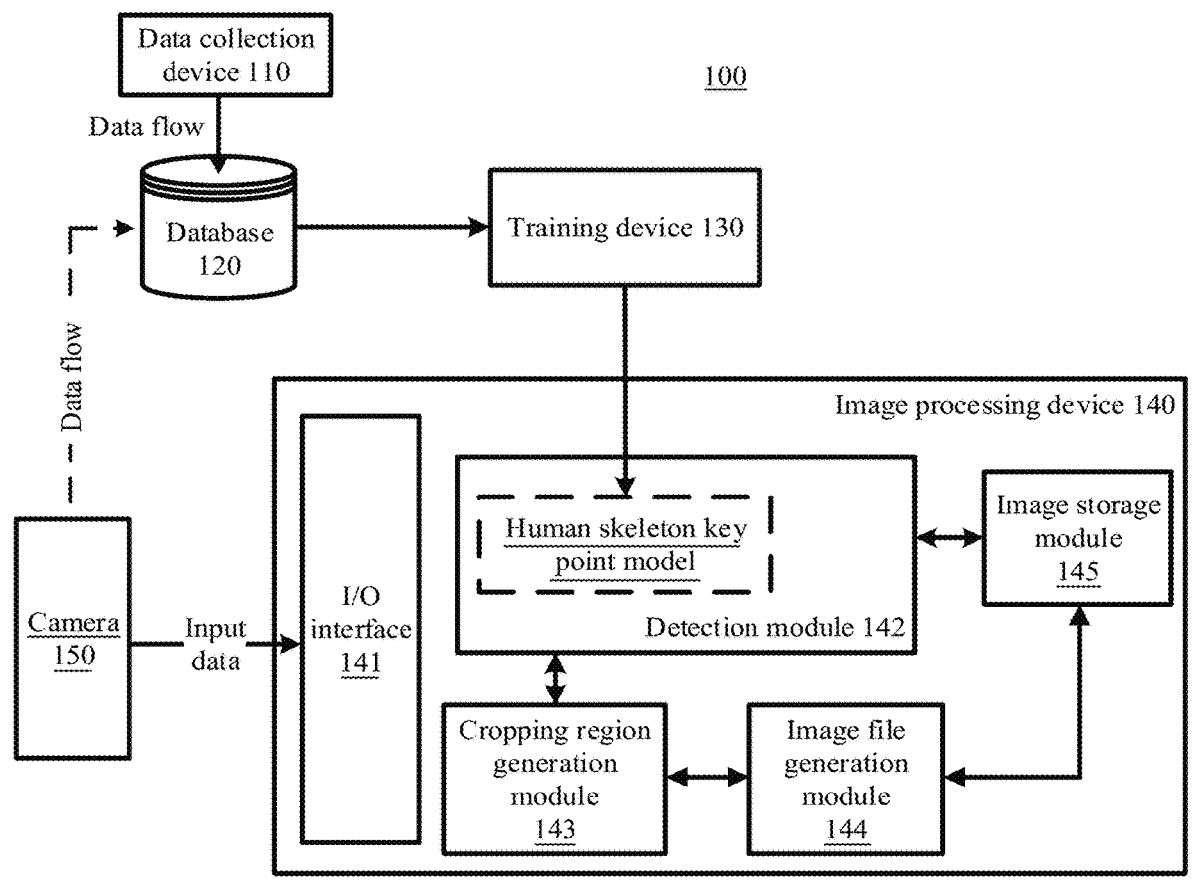
FIG. 4 is a schematic architectural diagram of an image processing system according to an embodiment of this application.

FIG. 4 shows an architecture of a system 100 that can implement image processing. The system 100 may be applied to photographing and image cropping application scenarios to implement intelligent image processing.

In this embodiment of this application, a data collection device 110 is configured to collect a large quantity of character images. The character images are images including characters, and a posture, an expression, whether the images include a whole body, and the like in the collected character images are not limited. For example, the character image may be a whole-body photo of a person, a selfie photo of a person, or a group photo of a plurality of persons. The character images collected by the data collection device 110 are stored in a database 120. The database 120 is configured to maintain the character images input by the data collection device 110, and optionally perform engineering processing to generate training data required by a training device 130. In this embodiment of this application, human skeleton key points need to be labeled on the character images collected by the data collection device 110. Optionally, a specific labeling rule is labeling based on joints and bone projections. For example, one human joint is labeled as one human skeleton key point. In actual implementation, before the human skeleton key points are labeled on the character images collected by the data collection device 110, a human skeleton key point of a human body needs to be defined based on experience of photographing aesthetics, and corresponding human skeleton key points are labeled on characters in the character images based on the defined human skeleton key point. Optionally, a human joint, a bone protrusion, and a specific human body structure corresponding to the number 1 in FIG. 2 are used as labeling references to perform labeling on the character images collected by the collection device 110 to obtain labeled character images. The training device 130 obtains the labeled character images, namely, training data, from the database 120, and optionally trains a constructed neural network model by using the training data to obtain a human skeleton key point model, for example, a convolutional neural network (CNN) or a deep neural network (DNN). The human skeleton key point model obtained after training may be used to predict a human skeleton key point of a character in an input character image. The human skeleton key point model obtained by the training device 130 may be applied to different systems or devices. In this embodiment of this application, the human skeleton key point model obtained by the training device 130 is configured in an image processing device 140.

An input/output (I/O) interface 141 is configured for the image processing device 140 to exchange data with an external device. In this embodiment of this application, a camera 150 randomly takes a character photo such as a group photo of two persons. The character photo taken by the camera 150 may be input into the image processing device 140 through the I/O interface 141. The image processing device 140 inputs the character photo input through the I/O interface 141 into a detection module 142 for detecting human skeleton key points of a character in the photo. Specifically, the detection module 142 may input the character photo into the human skeleton key point model configured in the detection module 142, to obtain a human skeleton key point set. The human skeleton key point set may be presented in a form of a matrix, or may be presented in a form of a heat map. This is not limited herein. A cropping region generation module 143 further processes, based on the human skeleton key point set obtained by the detection module 142 and a preset rule, the character photo taken by the camera 150, to obtain a cropping region for the character photo. An image file generation module 144 generates an image file based on an image part that is of the character photo and that corresponds to the cropping region, and stores the image file in an image storage module 145. Similar to a graphics library, the image storage module 145 is configured to store an image processed by the image processing device 140, and may also store an unprocessed image.

It should be noted that the cropping region in this embodiment of this application may be presented in a visible form in the character photo, or may not be presented in the character photo. A beneficial effect of presentation is that the character photo in which the cropping region is presented may be displayed on a screen, so that a user can intuitively view the character photo or adjust the cropping region. A beneficial effect of non-presentation is that a processed image may be obtained without awareness of a user.

In the foregoing embodiment of this application, a to-be-processed image, namely, the foregoing character photo, is obtained by using the camera 150. In another embodiment of this application, an image that needs to be processed may be obtained from the image storage module 145. For processing steps, refer to the foregoing related descriptions. Details are not described herein again.

The system 100 shown in FIG. 4 may be a cloud coordination system, or may be an entire system configured in a device. In specific implementation, the image processing device 140 may be a local device such as a mobile phone, a tablet computer, or a personal computer, the training device 130 and the database 120 may be disposed on the cloud, and the cloud provides the human skeleton key point model obtained through training to a plurality of local devices. FIG. 4 is merely an example, and a specific physical architecture of the system 100 is not limited.

Figure 5:
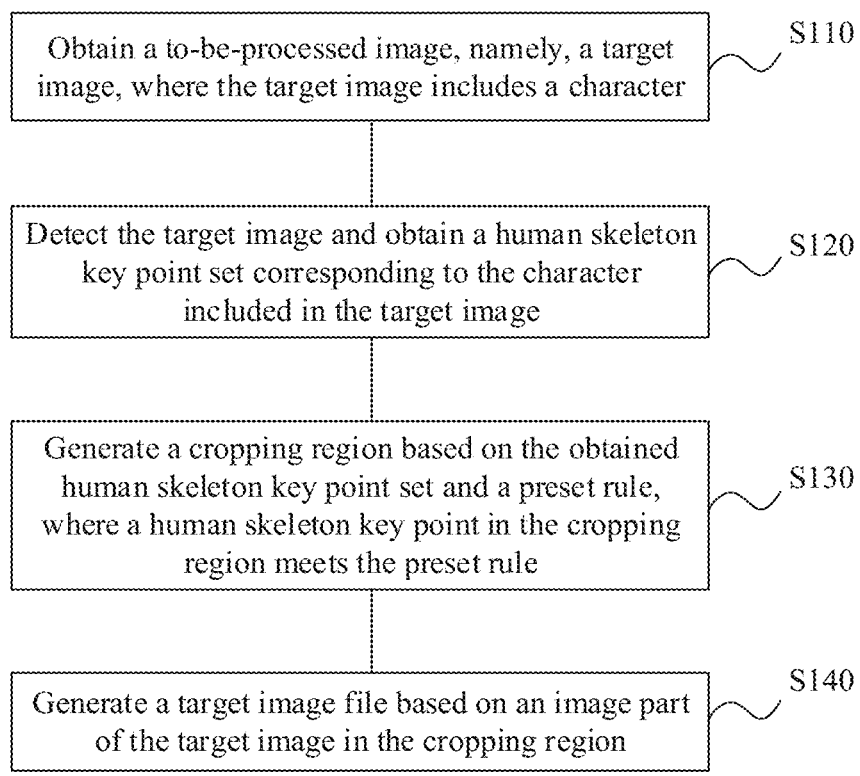
FIG. 5 is a flowchart of an image processing method according to an embodiment of this application.

FIG. 5 shows an image processing method. The image processing method may be implemented by using all or some components of the system described in the embodiment corresponding to FIG. 4. The image processing method includes the following steps.

S110. Obtain a to-be-processed image, namely, a target image, where the target image includes a character, and a quantity of characters included in the target image is not limited. Specifically, the target image may be obtained by using an image collection device. For example, the target image is obtained in real time in a photographing mode by using a camera, or the target image may be obtained from a database storing an image, for example, the target image may be obtained from a graphics library.

S120. Detect the target image and obtain a human skeleton key point set corresponding to the character included in the target image. Generally, one character in the image corresponds to one human skeleton key point set, and one human skeleton key point set includes a plurality of human skeleton key points. It should be noted that the human skeleton key point set herein is a set including detected human skeleton key points of a character part presented in the target image. For example, if a character image in the target image is the upper half of the character, the human skeleton key point set includes human skeleton key points of the upper half of the character in the target image. The human skeleton key point set is a logical concept definition, and a specific expression form of the human skeleton key point set may be a mathematical expression form such as a matrix or a set, or may be an image in which human skeleton key points are labeled and that has a same size as the target image.

Further, S120 includes S121 and S122, which are specifically as follows.

S121. Input the target image into a human skeleton key point model, where the human skeleton key point model outputs a heat map in which human skeleton key points are labeled.

S122. Extract human skeleton key points from the heat map in which human skeleton key point are labeled, to obtain the human skeleton key point set, where any human skeleton key point in the human skeleton key point set includes location information and a confidence level. The location information is used to indicate location information of a human skeleton key point in the image, and may be represented by using coordinates in a unified coordinate system. The confidence level is trustworthiness of a labeled human skeleton key point for an actual human skeleton key point, and is represented by using a score value. In this embodiment of this application, a plane coordinate system is constructed based on the target image. Any human skeleton key point may be represented by using (x, y, score), where x and y are coordinates of a human skeleton key point, and score is used to indicate a confidence level of the human skeleton key point. Further, (x, y, score) of all the human skeleton key points in the human skeleton key point set may be labeled in an image in which locations of the human skeleton key points are labeled, to obtain a more intuitive image.

In specific implementation, a key point location tracking technology may be introduced to process an image sequence, to obtain a human skeleton key point in real time. Specifically, any existing key point tracking technology may be used. This is not limited in this application.

For training of the human skeleton key point model, refer to descriptions in the embodiment corresponding to FIG. 4. A training method of the human skeleton key point model is not limited.

Optionally, a specific method for the detecting the target image and obtain a human skeleton key point set corresponding to the character included in the target image in S120 is not limited to the foregoing implementation by using the human skeleton key point model, and may also be any existing method that can identify a human skeleton key point of a character in an image.

S130. Generate a cropping region based on the obtained human skeleton key point set and a preset rule, where a human skeleton key point in the cropping region meets the preset rule.

Specifically, S130 includes steps S131 and S132, which are described as follows.

S131. Detect whether each of the human skeleton key points in the obtained human skeleton key point set meets the preset rule.

In this embodiment of this application, the following method is used to determine whether a human skeleton key point meets the preset rule.

For any human skeleton key point A to be used in determining whether the human skeleton key point A meets the preset rule, determining whether a confidence level of the human skeleton key point A is greater than a preset threshold, if the confidence level of the human skeleton key point A is greater than the preset threshold, calculating a reference point C based on the human skeleton key point A and a human skeleton key point B, where location information of the reference point C is specifically calculated, and the human skeleton key point B is a human skeleton key point that is adjacent to the human skeleton key point A and that is close to a human heart, and further determining whether the reference point C is located in the target image, where if the reference point C is located in the target image, it indicates that the human skeleton key point A meets the preset rule, or if the reference point C is not located in the target image, it indicates that the human skeleton key point A does not meet the preset rule.

Figure 6:
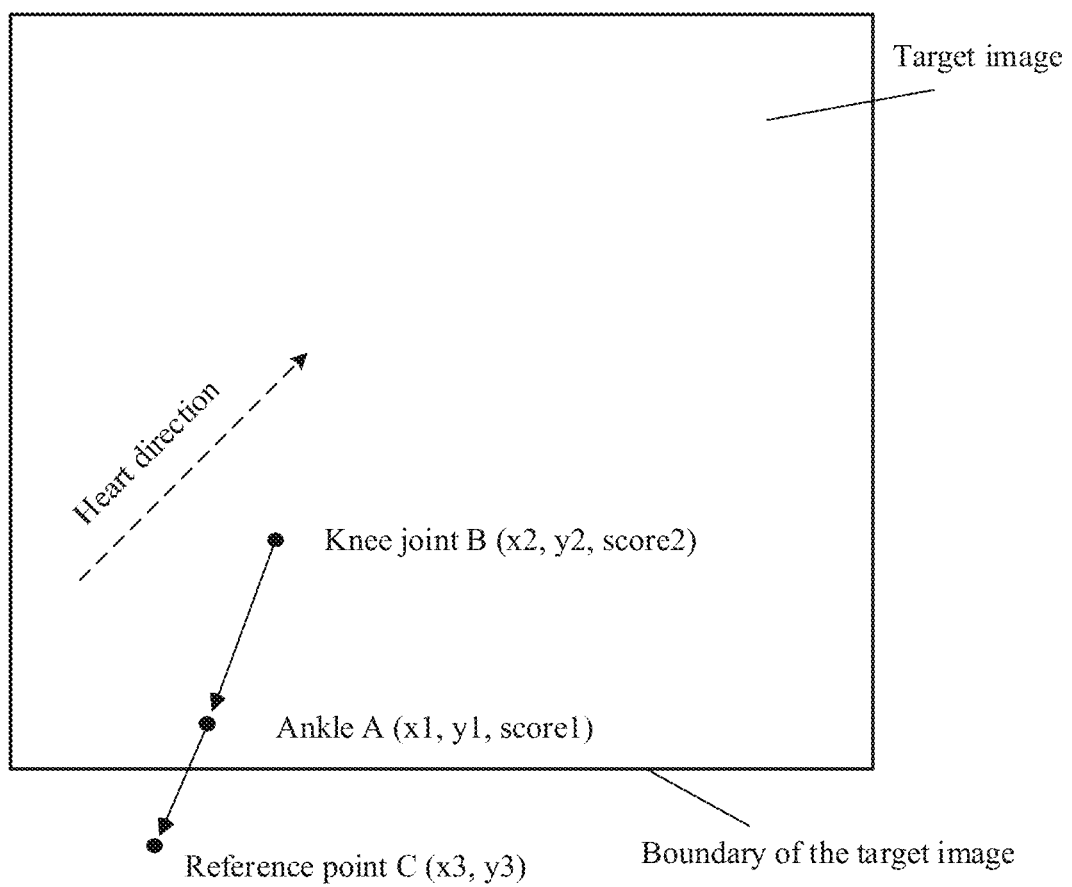
FIG. 6 is a schematic diagram of determining whether a human skeleton key point meets a preset rule according to an embodiment of this application.

The following uses an ankle as an example to describe how to determine whether a human skeleton key point meets the preset rule. Another human skeleton key point is similar. Refer to FIG. 6.

First Phase.

Input an ankle A (x1, y1, score1).

If score1≤threshold,
    the ankle A is not detected, and no processing is performed, or else,
    it is checked whether the ankle A is quite close to a boundary of the target image.

The foregoing process is determining a relationship between a confidence level of a human skeleton key point and a preset threshold. If the confidence level of the human skeleton key point is less than the preset threshold, it is considered that the human skeleton key point is not detected, and therefore no processing is performed, or otherwise, processing of a second phase is performed.

Second Phase.

1. Determine a related human skeleton key point that is adjacent to the ankle A and closer to a human heart than the ankle A. It should be noted that "adjacent" may be further defined as follows. Human body structures corresponding to two human skeleton key points are connected. In this embodiment of this application, the related human skeleton key point of the ankle A is a knee joint B (x2, y2, score2).

By analogy, a human skeleton key point related to a human skeleton key point named an elbow joint is a shoulder joint, and a human skeleton key point related to a human skeleton point named an ear is an eye.

2. Calculate a reference point C (x3, y3) based on the ankle A (x1, y1) and the knee joint B (x2, y2). Specific calculation formulas are as follows:

$$x3=x1+(x1-x2)\times ratio1, \text{ and}$$

$$y3=y1+(y1-y2)\times ratio1,$$

where ratio1 is a value that is set as a coefficient based on experience. Ratios of different human skeleton key points may be different in actual implementation.

3. Determine whether the reference point C is located in the target image, in other words, determine whether the reference point C (x3, y3) falls within or outside the boundary of the target image. If the reference point falls outside the boundary of the target image, it indicates that the ankle A is quite close to the boundary of the target image or is located on the boundary of the target image, in other words, the ankle A is not located in the target image, and does not meet the preset rule, or otherwise, the ankle A meets the preset rule. As shown in FIG. 6, the reference point C falls outside the boundary of the target image. Therefore, the ankle A is quite close to the boundary of the target image. Specifically, the ankle A is quite close to a lower boundary of the target image, and does not meet the preset rule.

S132. Generate a cropping region based on location information of a human skeleton key point that meets the preset rule, where all human skeleton key points in the cropping region meet the preset rule. It should be noted that the cropping region is differently determined in different modes. The following further describes two cases by using the ankle A as an example.

Figure 7:
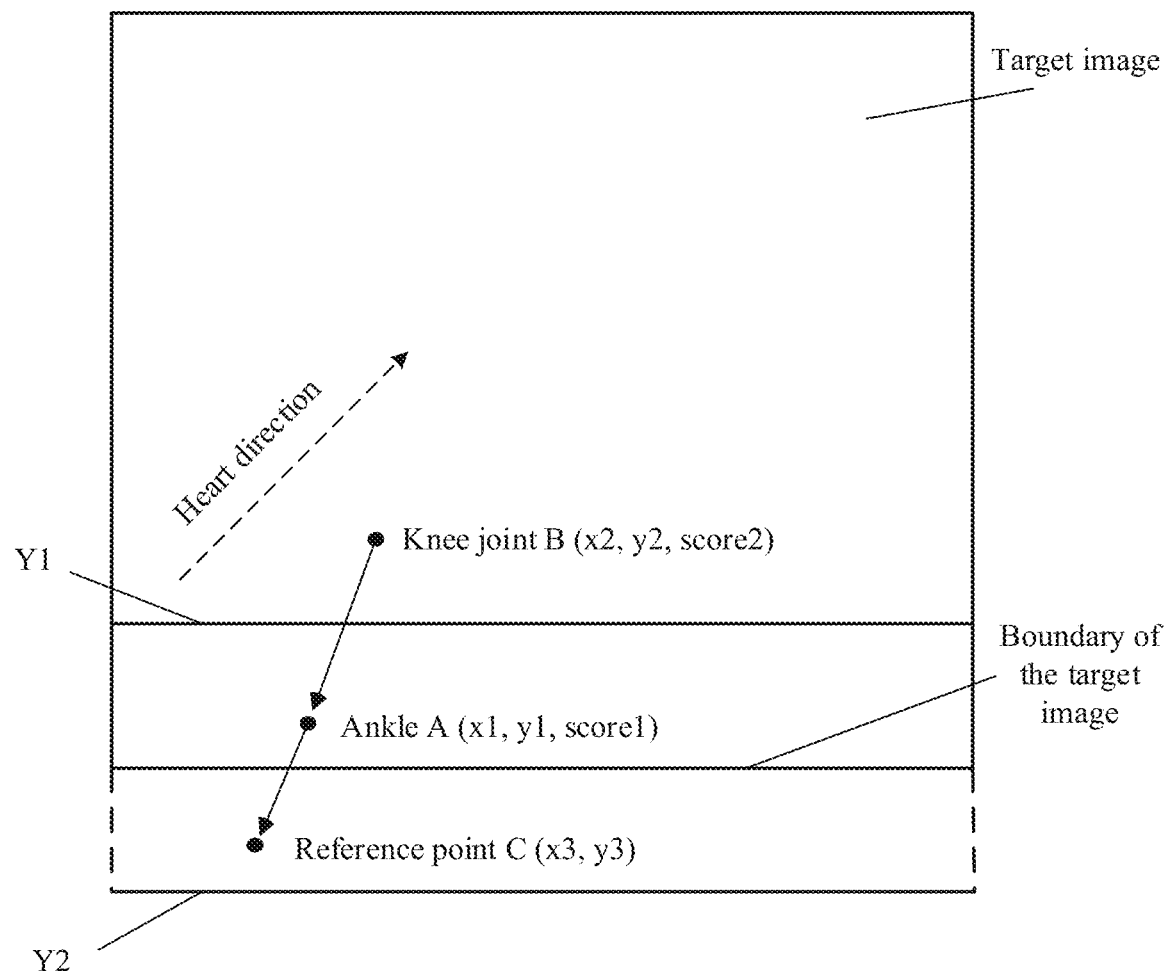
FIG. 7 is a schematic diagram of determining a boundary of a cropping region according to an embodiment of this application.

As shown in FIG. 7, the ankle A is quite close to the lower boundary of the target image, and the ankle A does not meet the preset rule, but it does not indicate that a cropping region generated after processing does not include the ankle A.

It can be learned from the foregoing that the ankle A is quite close to the lower boundary of the target image. Therefore, when the cropping region is generated, a location of a suitable lower boundary of the cropping region may be obtained by using the following method. A calculation manner is as follows:

$$Y1=y2+(y1-y2)\times ratio2, \text{ and}$$

$$Y2=y1+(y1-y2)\times ratio3,$$

where ratio2 and ratio3 are values that are set as coefficients based on experience. It can be learned from the foregoing formulas that there are two boundary locations Y, one of the locations is an inner boundary Y1, and is located above the lower boundary of the target image, and the other location is an outer boundary Y2, and is located below the lower boundary of the target image. As shown in the figure, the ankle is used as an example. A corresponding lower boundary that is of the cropping region and that is parallel to the lower boundary of the target image is generated based on a calculated Y value without consideration of another human skeleton key point. Clearly, this is merely an example. A premise for the foregoing is that a coordinate system is constructed by using mutually perpendicular boundaries of the target image, and coordinates of A, B, and C are separately represented. Further, it is necessary to detect whether the boundary location Y (Y1 or Y2) can cause all human skeleton key points in the cropping region whose lower boundary is Y to meet the preset rule. If at least one human skeleton key point does not meet the preset rule, corresponding Y is not recommended, and another lower boundary needs to be re-determined according to the foregoing method. A process of determining another boundary is similar to the process of determining the lower boundary, and details are not described again.

It should be noted that although the foregoing provides a method for calculating two possible boundary locations of one cropping region boundary (the foregoing lower boundary), the two possible boundary locations may not need to be calculated at the same time. The following provides further descriptions.

In the photographing mode, the target image is an image obtained by using the camera in real time. Optionally, two boundaries are calculated for any boundary of the cropping region, because even if a calculated boundary location (for example, Y2 shown in FIG. 7) falls outside the target image, the camera may be adjusted so that the boundary location outside the target image falls within a target image obtained in real time after the camera is adjusted. In actual implementation, whether the calculated boundary location is determined as a boundary of the cropping region still needs to follow the foregoing description of further detecting whether the calculated boundary location can cause all the human skeleton keys in the cropping region whose lower boundary is Y to meet the preset rule.

In an offline mode, namely, a non-photographing mode, only a boundary location within the target image needs to be calculated, because if a target image is obtained from a graphics library in the offline mode, for example, a size and content of the target image cannot be increased (a target image is obtained again by adjusting the camera). A cropping region generated in this case is similar to cropping the target image.

S140. Generate a target image file based on an image part of the target image in the cropping region.

Further, in the photographing mode, the target image file is generated in response to a photographing instruction based on the part that is of the target image and that is selected by using the cropping region, and the target image file is sent or stored.

Based on the description in the embodiment of this application corresponding to FIG. 5, optionally, before the generating a target image file based on an image part of the target image in the cropping region, the method further includes displaying the target image in an image preview region, and applying the cropping region to the target image to segment the target image into an intra-region image and an extra-region image.

In this case, the generating a target image file based on an image part of the target image in the cropping region is specifically generating the target image file based on the intra-region image, in other words, generating the target image file based on the image part of the target image in the cropping region.

Optionally, in the photographing mode, before the generating a target image file based on an image part of the target image in the cropping region, the method further includes displaying the target image in an image preview area, displaying a guide identifier on the target image, where the guide identifier is used to guide a user to adjust the camera, where the camera is adjusted to use the calculated boundary location as a boundary of the adjusted target image, and then applying the cropping region to the adjusted target image to segment the adjusted target image into an intra-region image and an extra-region image.

In this case, the generating a target image file based on an image part of the target image in the cropping region is specifically generating the target image file based on the intra-region image, in other words, generating the target image file based on the image part of the target image in the cropping region.

The foregoing application of the cropping region is a logical concept, and may be displaying a corresponding cropping box, or may be not directly displaying a corresponding cropping box. The application of the cropping region is described to better reflect a relationship between the cropping region and the target image.

The applying the cropping region is specifically displaying, on the target image, a cropping box corresponding to the cropping region, where the cropping box segments the target image into an intra-box image and an extra-box image, the intra-box image is the intra-region image, and the extra-box image is the extra-region image.

Optionally, the applying the cropping region is specifically adjusting a display parameter of the target image to segment the target image into two visually significantly different regions, where one region corresponds to the intra-region image, and the other region corresponds to the extra-region image.

According to the image processing method provided in this embodiment of this application, the corresponding cropping region is generated based on the preset rule and the human skeleton key points of the character in the to-be-processed image, and the part that is of the to-be-processed image and that is selected by using the cropping region is output as the target image. The human skeleton key points and the preset rule are set based on photographing experience. Therefore, according to the image processing method provided in this embodiment of this application, a user who does not have enough photographing experience can easily obtain an image that conforms to photographing aesthetics, so that user experience is enhanced.

Figure 8:
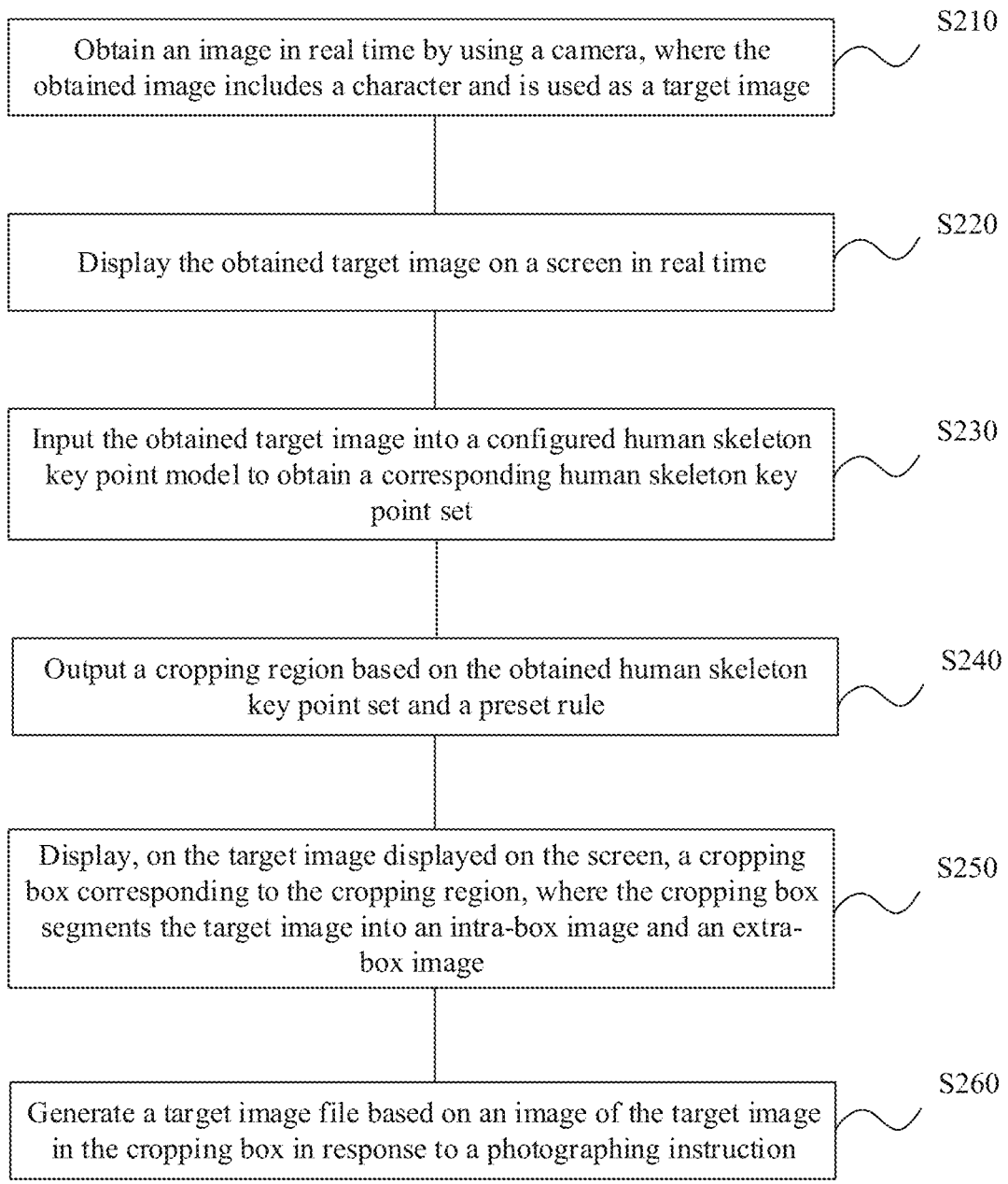
FIG. 8 is a flowchart of another image processing method according to an embodiment of this application.

FIG. 8 shows an image processing method. The present disclosure is applied to a photographing scenario. Specific steps are as follows.

S210. Obtain an image in real time by using a camera, where the obtained image includes a character and is used as a target image.

S220. Display the obtained target image on a screen in real time.

S230. Input the obtained target image into a configured human skeleton key point model to obtain a corresponding human skeleton key point set. For a specific method, refer to the foregoing related descriptions.

S240. Output a cropping region based on the obtained human skeleton key point set and a preset rule. For a specific method, refer to the foregoing related descriptions.

S250. Display, on the target image displayed on the screen, a cropping box corresponding to the cropping region, where the cropping box segments the target image into an intra-box image and an extra-box image.

S260. Generate a target image file based on an image of the target image in the cropping box in response to a photographing instruction.

In another optional solution, optionally, step S250 is displaying a guide identifier on the target image displayed on the screen, where the guide identifier is used to guide a user to adjust the camera, so that a cropping box corresponding to the cropping region is fully displayed on the target image displayed on the screen. For example, if Y2 in the foregoing embodiment of this application is used as a lower boundary of the cropping region, the camera may be adjusted downward or moved backward, so that Y2 is displayed on the screen. It should be noted that if the user chooses to adjust the camera based on the guide identifier, correspondingly, the target image in step S260 is clearly an image obtained by the adjusted camera.

In another optional solution, optionally, step S250 is directly displaying, on the screen, an image part of the target image in the cropping region, and correspondingly, optionally, step S260 is generating a target image file based on the image displayed on the screen. In this optional solution, a processed image can be obtained without awareness of the user, so that non-awareness experience of the user is enhanced. Optionally, step S220 may not be performed, so that non-awareness experience of the user is further enhanced. In a current development trend of technologies and operations toward simplification, non-awareness experience is a presentation of device or terminal intelligence.

It should be noted that a sequence of step S220, step S230, and step S240 is not limited.

Figure 9:
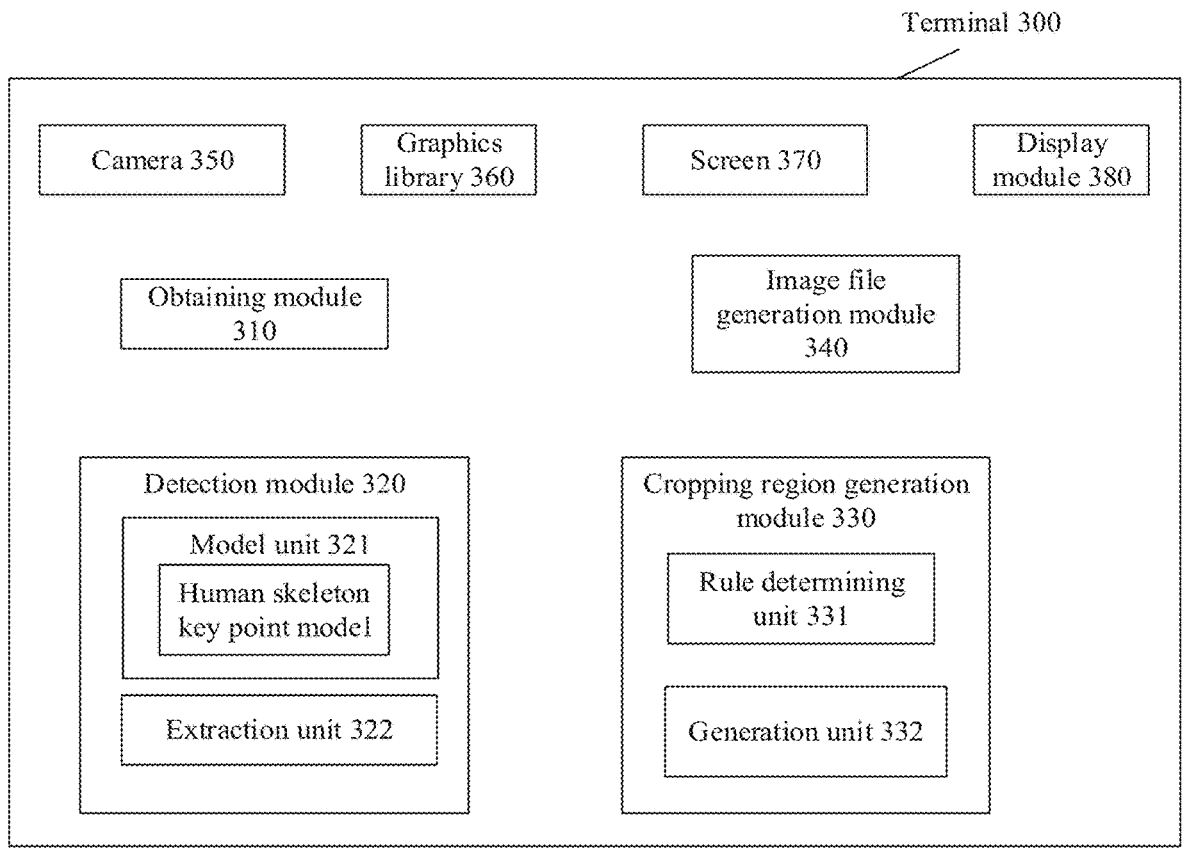
FIG. 9 is a schematic diagram of a terminal that may be used for image processing according to an embodiment of this application.

FIG. 9 shows a terminal 300, used for image processing. The terminal 300 can implement all or a part of the method described in the embodiment corresponding to FIG. 5. Specifically, the terminal 300 includes an obtaining module 310 for obtaining a target image, where the target image includes a character, a detection module 320 for detecting the character in the target image to obtain a human skeleton key point set, where the human skeleton key point set includes a plurality of human skeleton key points, a cropping region generation module 330 for generating a cropping region based on the human skeleton key point set and a preset rule, where a human skeleton key point in the cropping region meets the preset rule, and an image file generation module 340 for generating a target image file based on an image part of the target image in the cropping region.

Further, a human skeleton key point model is configured for the detection module 320, and the detection module 320 is configured to detect the character in the target image by using the human skeleton key point model, to obtain the human skeleton key point set, where each human skeleton key point in the human skeleton key point set includes location information and a confidence level, the location information is used to indicate a location of a corresponding human skeleton key point in the target image, the confidence level is used to indicate trustworthiness of the corresponding human skeleton key point, the human skeleton key point model is obtained through training by using labeled data, and the labeled data is an image that includes a character and in which human skeleton key points of the character are labeled. For a method for training the human skeleton key point model, refer to the related descriptions in the foregoing embodiments. Details are not described herein again.

More specifically, the detection module 320 includes a model unit 321 and an extraction unit 322. The model unit 321 is configured to input the target image into the human skeleton key point model configured in the model unit 321, to obtain a human skeleton key point heat map. The extraction unit 322 is configured to extract human skeleton key points from the human skeleton key point heat map to obtain the human skeleton key point set.

Further, the cropping region generation module 330 includes a rule determining unit 331 and a generation unit 332. The rule determining unit 331 is configured to detect whether each of the human skeleton key points in the human skeleton key point set meets the preset rule. The generation unit 332 is configured to generate the cropping region based on location information of a human skeleton key point that meets the preset rule.

Specifically, the rule determining unit 331 is configured to determine whether a confidence level of a human skeleton key point A is greater than a preset threshold, if the confidence level of the human skeleton key point A is greater than the preset threshold, calculate a reference point C based on the human skeleton key point A and a human skeleton key point B, where the reference point C includes location information, and then determine whether the reference point C is located in the target image, where if the reference point C is located in the target image, it indicates that the human skeleton key point A meets the preset rule, or if the reference point C is not located in the target image, it indicates that the human skeleton key point A does not meet the preset rule. The human skeleton key point A is a human skeleton key point to be used in determining whether the human skeleton key point meets the preset rule, and the human skeleton key point B is a human skeleton key point that is adjacent to the human skeleton key point A and that is close to a human heart.

Further, the terminal 300 further includes a camera 350, and the obtaining module 310 is configured to obtain the target image in real time in a photographing mode by using the camera 350, and the image file generation module 340 is configured to generate the target image file based on the image part of the target image in the cropping region in response to a photographing instruction.

Optionally, the terminal 300 includes a graphics library 360, and the obtaining module 310 is configured to obtain the target image from the graphics library 360, and the image file generation module 340 is configured to generate the target image file based on the image part of the target image in the cropping region in response to a cropping instruction.

The terminal 300 further includes a screen 370 and a display module 380, and the display module 380 is configured to control the target image to be displayed in an image preview region of the screen 370, and apply the cropping region to the target image to segment the target image into an intra-region image and an extra-region image, and the image file generation module 340 is configured to generate the target image file based on the intra-region image.

Optionally, the display module 380 is configured to control the target image to be displayed in an image preview region of the screen 370, display a guide identifier on the target image, where the guide identifier is used to guide a user to adjust the camera, and apply the cropping region to the adjusted target image to segment the adjusted target image into an intra-region image and an extra-region image, and the image file generation module 340 is configured to generate the target image file based on the intra-region image.

Further, the display module 380 is configured to display a cropping box on the target image to segment the target image into an intra-box image and an extra-box image, where the intra-box image corresponds to the intra-region image, and the extra-box image corresponds to the extra-region image, or adjust a display parameter of the target image to segment the target image into two visually significantly different regions, where one region corresponds to the intra-region image, and the other region corresponds to the extra-region image.

For the case in which the guide identifier is displayed to guide the user to adjust the camera, the display module 380 is configured to display a cropping box on the adjusted target image to segment the adjusted target image into an intra-box image and an extra-box image, where the intra-box image corresponds to the intra-region image, and the extra-box image corresponds to the extra-region image, or adjust a pixel parameter of the adjusted target image to segment the adjusted target image into two visually significantly different regions, where one region corresponds to the intra-region image, and the other region corresponds to the extra-region image.

Figure 10:
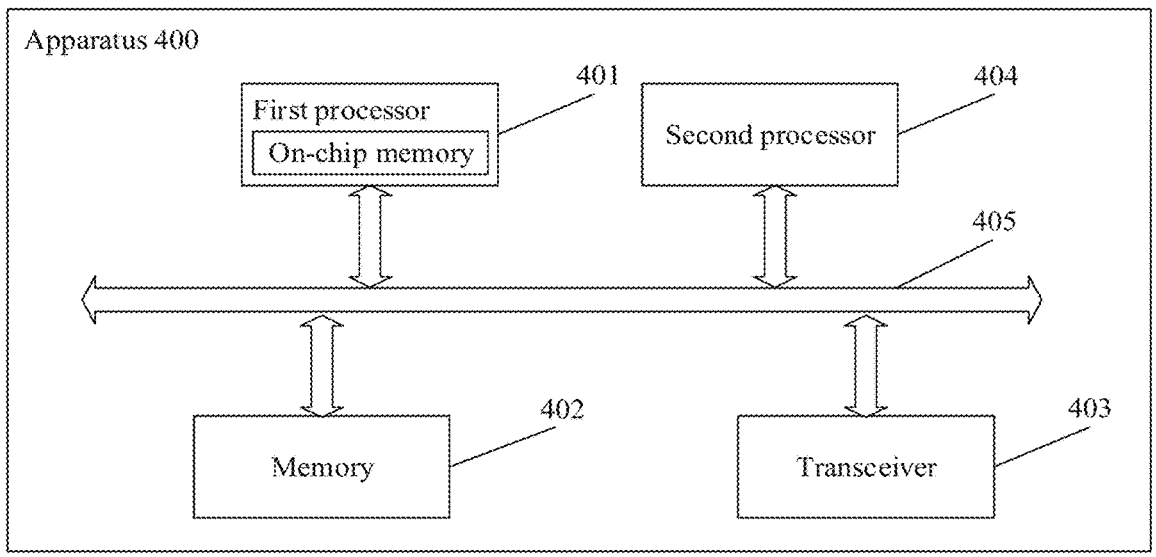
FIG. 10 is a schematic diagram of an apparatus that may be used for image processing according to an embodiment of this application.

FIG. 10 shows an apparatus 400, used for image processing. The apparatus 400 comprises a first processor 401, a memory 402, a transceiver 403, a second processor 404, and a communications bus 405.

The communications bus 405 is configured to implement connection and communication between these components.

The transceiver 403 is configured to perform data transmission with the outside.

The memory 402 may include a read-only memory and a random access memory, and provide instructions and data to the first processor 401 and the second processor 404. A part of the memory 402 may further include a nonvolatile random-access memory (NVRAM), for example, a random-access memory (RAM), a read-only memory (ROM), an electrically erasable programmable ROM (EEPROM), a compact disc-ROM (CD-ROM), an optical disc, a hard disk, or a magnetic storage apparatus. The memory 402 may be configured to store one or more of a computer program instruction, a preset parameter, data obtained by a computer by performing an intermediate operation, and the like.

The first processor 401 and the second processor 404 each may be a CPU, a digital processing unit, or the like.

In this embodiment of the present disclosure, optionally, the first processor 401 includes an on-chip memory, for example, a tightly-coupled memory (TCM), a cache, or an static RAM (SRAM), and the on-chip memory stores instructions. The first processor 401 is coupled to the on-chip memory to implement the methods described in the embodiments of the present disclosure corresponding to FIG. 3 and FIG. 7, or the first processor 401 is coupled to the on-chip memory to invoke the instructions in the on-chip memory, and is coupled to the memory 402 to obtain data, to implement the methods described in the embodiments corresponding to FIG. 5 and FIG. 8. In practice, the first processor 401 may be an independently sold chip, or may be integrated into a chip. The chip includes the first processor 401.

Optionally, by invoking the programs or the instructions stored in the memory 402, the second processor 404 is configured to implement the methods described in the embodiments of the present disclosure corresponding to FIG. 5 and FIG. 8.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, some or all of the procedures or functions according to the embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. An image processing method implemented by a processor, the image processing method comprising:
   obtaining a target image comprising a human character;
   detecting the human character to obtain a human skeleton key point set, wherein the human skeleton key point set comprises a plurality of human skeleton key points;
   generating a cropping region based on the human skeleton key point set and a preset rule, wherein the cropping region comprises an image part of the target image, wherein a first human skeleton key point in the cropping region meets the preset rule, wherein the preset rule comprises calculating a reference point based on a first human skeleton key point and a second human skeleton key point, wherein the reference point indicates that the first human skeleton key point meets the preset rule when the reference point is located in the target image, and wherein the second human skeleton key point is adjacent to the first human skeleton key point and that is associated with a human heart; and
   generating a target image file based on the image part.

2. The image processing method of claim 1, further comprising:
   obtaining a human skeleton key point model by training based on labeled data, wherein the labeled data is an image that comprises the human character and labels of human skeleton key points of the human character; and
   detecting the character using the human skeleton key point model to obtain the human skeleton key point set, wherein each human skeleton key point in the human skeleton key point set comprises location information and a confidence level, wherein the location information indicates a location of a corresponding human skeleton key point in the target image, and wherein the confidence level indicates trustworthiness of the corresponding human skeleton key point.

3. The image processing method of claim 2, further comprising:
   inputting the target image into the human skeleton key point model to obtain a human skeleton key point heat map, wherein the human skeleton key point heat map comprises labeled human skeleton key points based on the target image; and
   extracting the labeled human skeleton key points to obtain the human skeleton key point set.

4. The image processing method of claim 2, further comprising:
   detecting whether each of the human skeleton key points meets the preset rule; and
   generating the cropping region based on location information of a second human skeleton key point that meets the preset rule.

5. The image processing method of claim 4, further comprising:
   determining whether a confidence level of a first human skeleton key point is greater than a preset threshold;
   calculating the reference point based on the first human skeleton key point and the second human skeleton key point when the confidence level of the first human skeleton key point is greater than the preset threshold, wherein the reference point comprises location information of the first human skeleton key point; and
   determining whether the reference point is located in the target image, wherein when the reference point is not located in the target image, the reference point indicates that the first human skeleton key point does not meet the preset rule.

6. The image processing method of claim 1, further comprising:
   obtaining the target image in real time using a photographing mode of a camera; and
   generating the target image file based on the image part in response to a photographing instruction.

7. The image processing method of claim 6, wherein before generating the target image file, the image processing method further comprises:
   displaying the target image in an image preview region;
   displaying a guide identifier on the target image, wherein the guide identifier guides a user to adjust the camera;
   applying the cropping region to the target image to segment the target image into an intra-region image and an extra-region image; and
   generating the target image file based on the intra-region image.

8. The image processing method of claim 7, further comprising:
   displaying a cropping box on the target image to segment the target image into an intra-box image and an extra-box image, wherein the intra-box image is the intra-region image, and wherein the extra-box image is the extra-region image; or
   adjusting a pixel parameter of the target image to segment the target image into two regions, wherein a first region of the two regions corresponds to the intra-region image, and wherein a second region of the two regions corresponds to the extra-region image.

9. The image processing method of claim 1, further comprising:
   obtaining the target image from a graphics library; and
   generating the target image file based on the image part in response to a cropping instruction.

10. The image processing method of claim 1, wherein before generating the target image file, the image processing method further comprises:
    displaying the target image in an image preview region;
    applying the cropping region to the target image to segment the target image into an intra-region image and an extra-region image; and
    generating the target image file based on the intra-region image.

11. An image processing terminal, comprising:

a processor; and a memory coupled to the processor and configured to store instructions that, when executed by the processor, cause the terminal to be configured to:

obtain a target image comprising a human character;

detect the human character to obtain a human skeleton key point set, wherein the human skeleton key point set comprises a plurality of human skeleton key points;

generate a cropping region based on the human skeleton key point set and a preset rule, wherein the cropping region comprises an image part of the target image, wherein a first human skeleton key point in the cropping region meets the preset rule, wherein the preset rule comprises calculating a reference point based on a first human skeleton key point and a second human skeleton key point, wherein the reference point indicates that the first human skeleton key point meets the preset rule when the reference point is located in the target image, and wherein the second human skeleton key point is adjacent to the first human skeleton key point and that is associated with a human heart; and generate a target image file based on the image part.

12. The terminal of claim 11, wherein the instructions further cause the processor to be configured to:

obtain a human skeleton key point model by training based on labeled data, wherein the labeled data is an image that comprises the human character and labels of human skeleton key points of the human character; and detect the human character using the human skeleton key point model to obtain the human skeleton key point set, wherein each human skeleton key point in the human skeleton key point set comprises location information and a confidence level, wherein the location information indicates a location of a corresponding human skeleton key point in the target image, and wherein the confidence level indicates trustworthiness of the corresponding human skeleton key point.

13. The terminal of claim 12, wherein the instructions further cause the processor to be configured to:

input the target image into the human skeleton key point model to obtain a human skeleton key point heat map, wherein the human skeleton key point heat map comprises labeled human skeleton key points based on the target image; and extract the labeled human skeleton key points to obtain the human skeleton key point set.

14. The terminal of claim 12, wherein the instructions further cause the processor to be configured to:

detect whether each of the human skeleton key points meets the preset rule; and generate the cropping region based on location information of a second human skeleton key point that meets the preset rule.

15. The terminal of claim 14, wherein the instructions further cause the processor to be configured to:

determine whether a confidence level of a first human skeleton key point is greater than a preset threshold;

calculate the reference point based on the first human skeleton key point and the second human skeleton key point when the confidence level of the human skeleton key point is greater than the preset threshold, wherein the reference point comprises location information of the first human skeleton key point; and determine whether the reference point is located in the target image, wherein when the reference point is not located in the target image, the reference point indicates that the first human skeleton key point does not meet the preset rule.

16. The terminal of claim 11, wherein the instructions further cause the processor to be configured to:

obtain the target image in real time using a photographing mode of a camera; and generate the target image file based on the image part in response to a photographing instruction.

17. The terminal of claim 16, wherein before the instructions cause the processor to generate the target image file, the instructions further cause the processor to be configured to:

display the target image in an image preview region;

display a guide identifier on the target image, wherein the guide identifier guides a user to adjust the camera;

apply the cropping region to the target image to segment the target image into an intra-region image and an extra-region image; and generate the target image file based on the intra-region image.

18. The terminal of claim 11, wherein the instructions further cause the processor to be configured to:

obtain the target image from a graphics library; and generate the target image file based on the image part in response to a cropping instruction.

19. The terminal of claim 11, wherein before the instructions cause the processor to generate the target image file, the instructions further cause the processor to be configured to:

display the target image in an image preview region;

apply the cropping region to the target image to segment the target image into an intra-region image and an extra-region image; and generate the target image file based on the intra-region image.

20. A computer program product comprising computer-executable instructions stored on a non-transitory computer-readable storage medium that, when executed by a processor, cause an image processing terminal to:

obtain a target image comprising a human character;

detect the human character to obtain a human skeleton key point set, wherein the human skeleton key point set comprises a plurality of human skeleton key points;

generate a cropping region based on the human skeleton key point set and a preset rule, wherein the cropping region comprises an image part of the target image, wherein a first human skeleton key point in the cropping region meets the preset rule, wherein the preset rule comprises calculating a reference point based on a first human skeleton key point and a second human skeleton key point, wherein the reference point indicates that the first human skeleton key point meets the preset rule when the reference point is located in the target image, and wherein the second human skeleton key point is adjacent to the first human skeleton key point and that is associated with a human heart; and generate a target image file based on the image part.

* * * * *